United States Patent [19]

Åsberg

[11] Patent Number: 4,527,916
[45] Date of Patent: Jul. 9, 1985

[54] MEANS FOR MOUNTING A HUB BEARING UNIT TO A VEHICLE

[75] Inventor: Sture Åsberg, Gothenberg, Sweden

[73] Assignee: SKF Nova AB, Gothenberg, Sweden

[21] Appl. No.: 544,795

[22] Filed: Oct. 24, 1983

[30] Foreign Application Priority Data

Nov. 8, 1982 [SE] Sweden ............................... 8206319

[51] Int. Cl.³ .............................................. F16C 19/08
[52] U.S. Cl. ...................................... 384/513; 384/542
[58] Field of Search .................. 308/189 R, 190, 191, 308/192, 207 R; 384/443, 428, 513, 542, 537, 584, 585

[56] References Cited

U.S. PATENT DOCUMENTS

| | | | |
|---|---|---|---|
| 2,012,844 | 8/1935 | Wood | 384/438 |
| 3,306,684 | 2/1967 | Klein | 308/191 |
| 4,179,167 | 12/1979 | Lura et al. | 308/191 |
| 4,427,085 | 1/1984 | Aucktor | 308/189 R |

Primary Examiner—Lenard A. Footland
Attorney, Agent, or Firm—Eugene E. Renz, Jr.

[57] ABSTRACT

The invention relates to a means for mounting a hub bearing unit to the spring strut (13) of a vehicle. The means is characterized thereby that it (11) incorporated an open, box-like end, which is intended to be thread over the hub bearing unit and to be connected to this by means of bolts (7). The hub bearing unit thereby will be connected to the mounting means at both sides (10).

3 Claims, 2 Drawing Figures

've4,527,916

MEANS FOR MOUNTING A HUB BEARING UNIT TO A VEHICLE

BACKGROUND OF THE INVENTION

The present invention refers to a means for mounting a hub bearing unit to a vehicle or the like. The means may be fitted to or be an integral portion of a so called spring strut.

Hub bearing units for supporting vehicles are earlier known and have been used in motor cars. These hub bearing units thereby substitute conventional bearings and stub axles. Such a unit can be driven or non-driven. An example of a driven unit is shown in Swedish Pat. No. 8201969-6.

The hub bearing unit shown in said patent and also most other similar units are connected via the outer race, which has often a flange. The unit may also be connected to the vehicle via the inner part, whereby theouter part then will rotate and support the wheel. Common for all those units is however that they are all connected at one side and at said side affixed to the vehicle part by means of screws or the like. The units are thus mounted by being introduced horizontally and laterally and by being screwed.

The structure to which the unit is screwed is in most cases a moulded or forged steering knuckle housing. This in turn is connected to the vehicle whereby it can take up all forces that may come up. The design of a steering knuckle housing is well known and is not further described herein. In recent years it has however been proposed light and inexpensive designs made from stamped sheet metal, which are somewhat different from the conventional ones. These recent designs have a cupshaped design with a circumferential bottom flange connected to one side of the bearing unit. A considerable axial extension is required, in order to obtain a sufficient strength, which means that the design from a space point of view will infringe on the adjacent elements, such as brake housing and the like. This is especially pronounced at driven front wheels, where the drive shaft requires big space at skewing of the wheels. From this reason it has hitherto proven itself very difficult to combine a sheet metal design with a bearing unit in which the drive joint is made integral with the inner race ring of the bearing part, which ring with its axial compactness further reduces the available space.

SUMMARY OF THE INVENTION

A purpose of the present invention has been to provide a means for mounting hub bearing units of the above mentioned type, thus that a simplified and more compact design is obtained at the same time as it is given the required strength.

According to the invention this problem has been solved by providing a means for mounting a hub bearing unit to a vehicle or the like which is characterized thereby that it incorporated an open box-like end, which is intended to be thread over the hub bearing unit and which by means of bolt connections or the like is affixed to both sides of the hub bearing unit.

According to the invention it is an advantage if the open box-like end can be somewhat bent outwards at one or both ends.

According to a further feature of the invention the means should be made from stamped sheet metal, which can be connected to the spring strut of the vehicle e.g. by welding.

BRIEF DESCRIPTION OF THE DRAWING

The invention hereinafter will be further described with reference to the accompanying drawings, in which.

BRIEF DESCRIPTION OF THE PREFERRED EMBODIMENT

The figures show an embodiment in which the sheet metal housing is extremely simplified and has only the function of forming the connection between bearing unit and spring strut. This may then advantageously be welded to the spring strut and thus form a part thereof. This is made possible also thereby that the common annular design is not at hand, whereby at the mounting there will be no complications relative to the drive shaft, which then is generally already in position.

Figure 1:
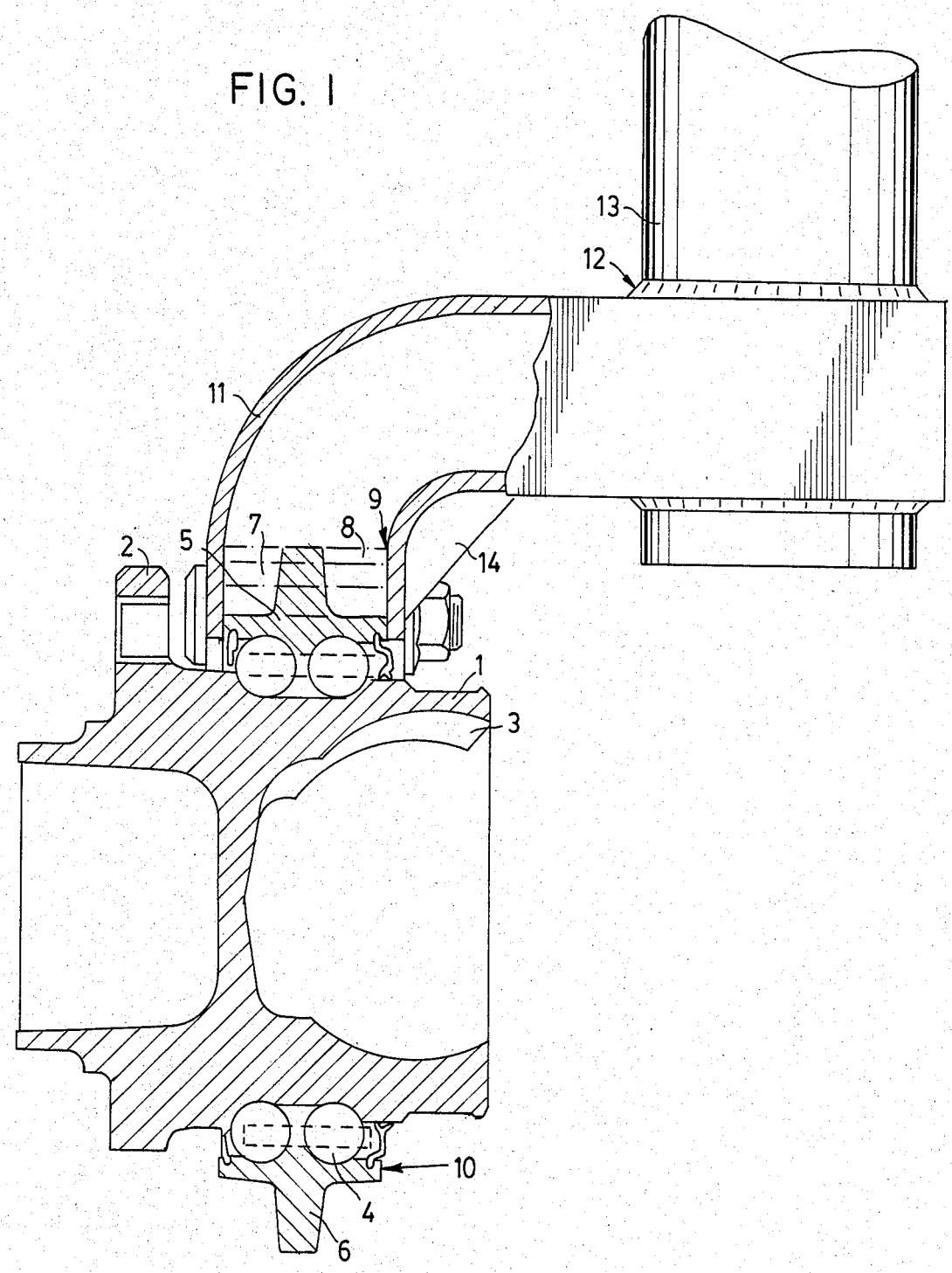
FIG. 1 shows a section through a hub bearing unit mounted with aid of the means according to the invention.

FIG. 1 shows a hub bearing unit for driven wheels. It incorporates an inner race ring 1, which is provided with a flange 2 for rigid mounting of a wheel. One part 3 of a drive joint is arranged in the inner race ring 1. The unit has two rows of rolling bodies 4 and an outer race ring 5 situated outside said rolling bodies. This outer race ring 5 has a flange 6 which is symmetrically arranged between the rows of balls 4. Bolt holes 7 are drilled in the flange 6 for the connection of the unit to the vehicle. The flange 6 is at the bolt holes 7 equipped with bosses 8 extending to both sides planes. The bolt holes are hereby made long and will thereby give a required distance measure between the walls of the box. The end 9 of the boss 8 is as can be seen in level with the side 10 of the outer race ring which shall engage the connection means according to the invention. The connection means of the vehicle is in the figure made in form of a stamped sheet metal housing 11.

The stamped sheet metal housing 11 is designed as a box with an open lower end. The strength of the structure due to its box-shaped will be optimal and its connection to the hub bearing unit will be very safe as it is attached thereof at the widely spreaded apart sides of the outer race ring 5. The box structure 11 is welded to the spring strut at 12 in this figure. The box-shaped sheet metal housing 11 however at mounting the box parts are screwed together to the hub bearing unit. This embodiment is not shown in the drawings. In order to make the box particularly strong it is possible to reinforce it e.g. with a crease 14. The essential width between the attachment surfaces (=the bearing width) can also be increased with some form of spacing element. Such an element can also take up or accomplish another function in the wheel concept.

Figure 2:
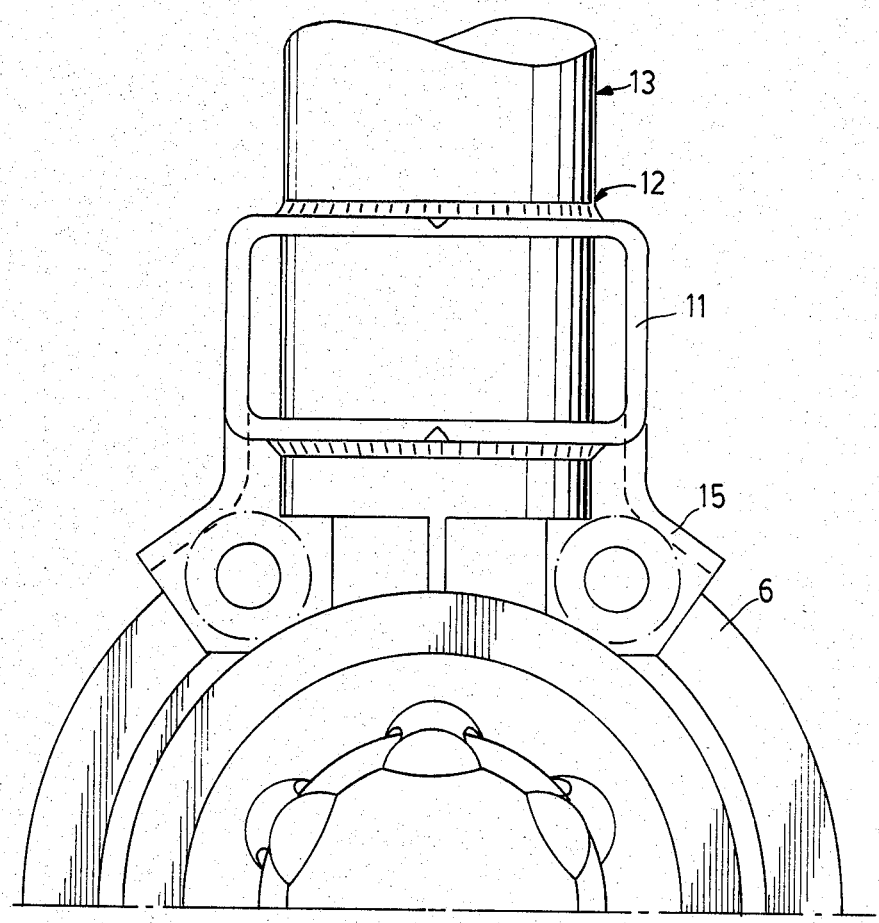
FIG. 2 shows the same mounting as seen from the side.

FIG. 2 shows the box-like unit 11 as seen from the side. It is at one hand attached to the flange 6 of the hub bearing unit by means of bolts and on the other hand welded to the spring strut 13 by means of welds 12. At the open lower end the box 11 has been bent outwards so as to be provided with shanks 15. In this manner the box at one hand will become stronger, and on the other hand the location of the attachment holes is better from a construction point of view.

Besides what has been shown there is also attachments for other functions, such as for brake and lower ball joint. The means for these attachments are not part of the present invention.

The invention is not limited to the embodiment shown but can be varied in several manners within the scope of the claims.

I claim:

1. In a hub bearing unit for a vehicle or the like, an inner annular member having a flange for attachment to the wheels of the vehicle and an inner raceway, an outer ring having an outer raceway confronting the inner raceway, a radially outwardly projecting circumferentially extending flange on the outer ring and a plurality of rolling elements in the annular space between the raceways and means for mounting the hub bearing unit to the frame structure of the vehicle comprising a stamped sheet metal housing of hollow tubular configuration having an open end which straddles the outer ring having oppositely directed circumferentially extending shank portions and fastener means to secure the housing at said shank portions to said outer ring flange and means for connecting the housing to the spring strut of the vehicle at the end of said housing remote from said shank portions.

2. In a hub bearing unit as claimed in claim 1, including boss members interposed between said flange and said hollow tubular housing at said shank portions and wherein said fastener means comprises bolt members engageable through openings in said shank portions and flange and boss members.

3. In a hub bearing unit as claimed in claim 1, wherein said housing is secured to the spring strut by welding.

* * * * *